July 28, 1959     S. J. BOKER ET AL     2,896,533
CHECKWRITER
Filed Feb. 4, 1958     2 Sheets-Sheet 1
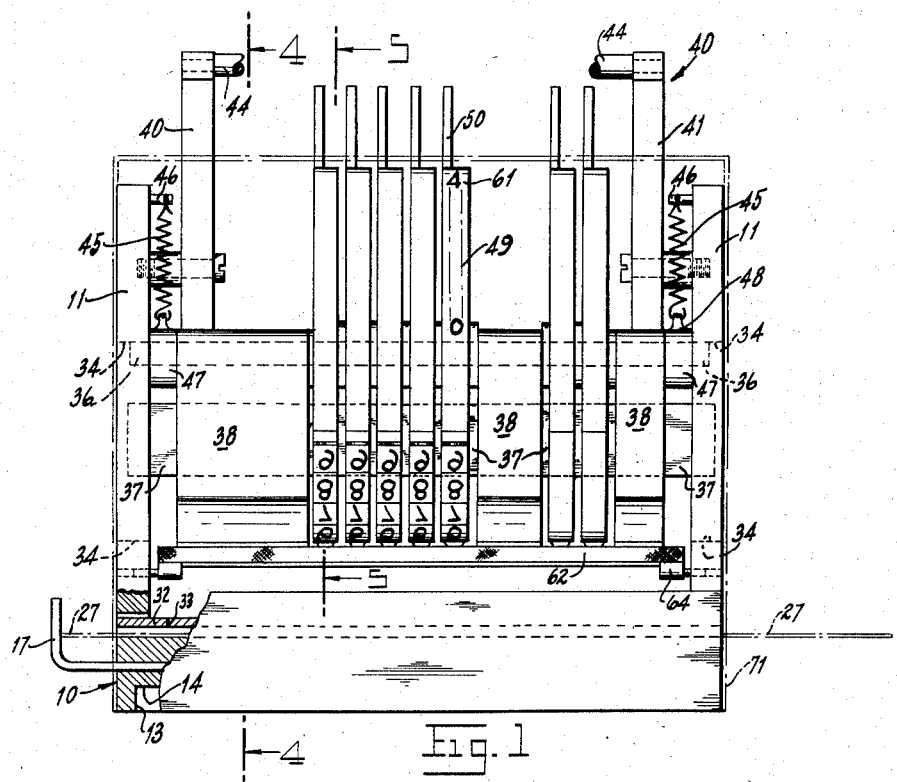
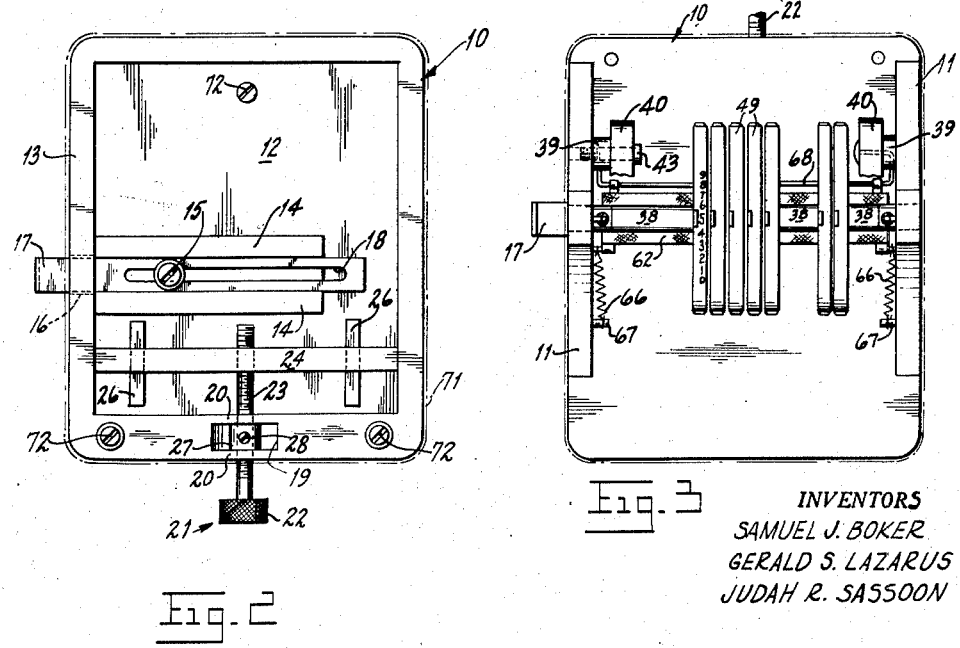
INVENTORS
SAMUEL J. BOKER
GERALD S. LAZARUS
JUDAH R. SASSOON July 28, 1959
S. J. BOKER ET AL
2,896,533
CHECKWRITER
Filed Feb. 4, 1958
2 Sheets-Sheet 2
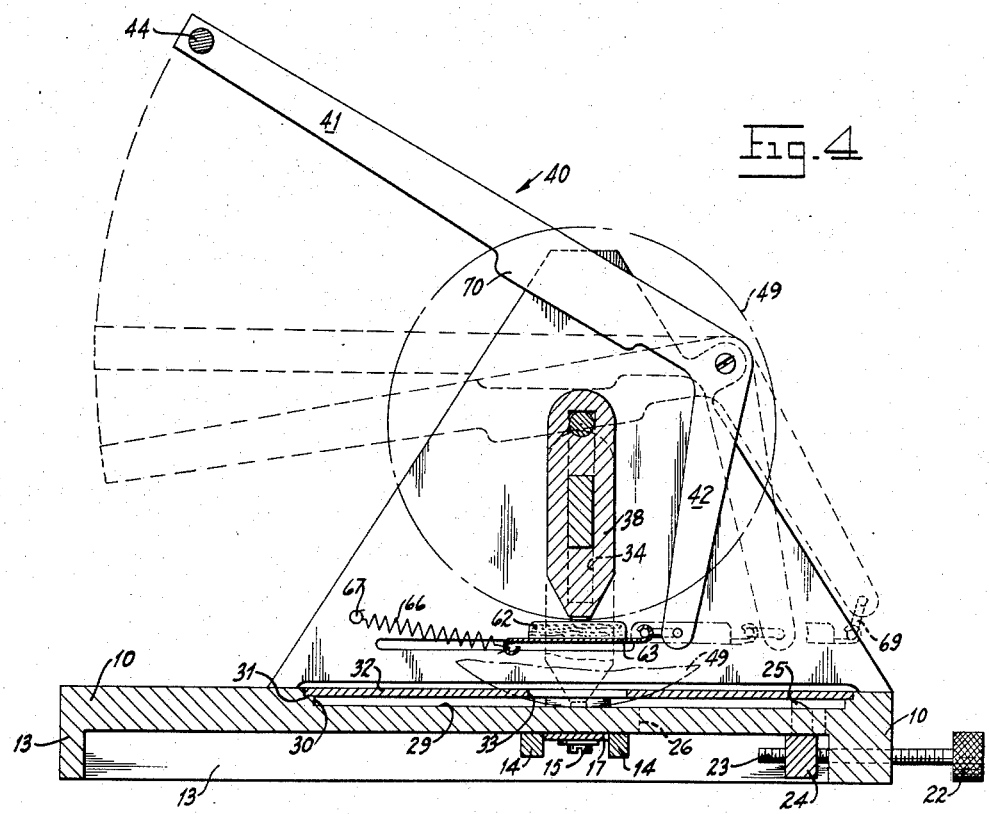
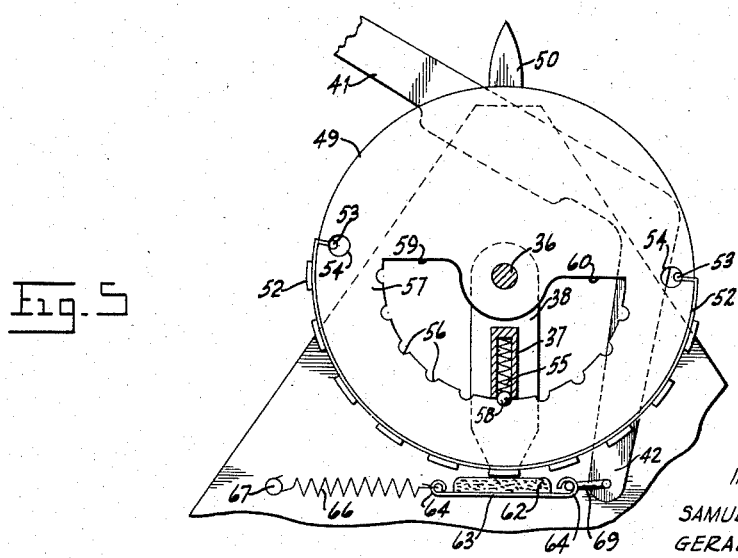
INVENTORS
SAMUEL J. BOKER
GERALD S. LAZARUS
JUDAH R. SASSOON

United States Patent Office 2,896,533
Patented July 28, 1959

2,896,533

CHECKWRITER

Samuel J. Boker, Brooklyn, Gerald S. Lazarus, Bethpage, and Judah R. Sassoon, Jackson Heights, N.Y.

Application February 4, 1958, Serial No. 713,248

5 Claims. (Cl. 101—101)

This invention rleates to a manually operated check writer.

It is an object of this invention to provide a checkwriter of inexpensive construction.

It is another object of this invention to provide a checkwriter of simple operation.

These and other objects of this invention will become apparent upon reading the following descriptive disclosure taken in conjunction with the accompanying drawing in which:

Fig. 1 is a front view, broken away in part, showing the working elements of the checkwriter and further showing the cover in dotted outline, Fig. 2 is a bottom view of the checkwriter showing in peripheral dotted outline the cover, Fig. 3 is a top view of the checkwriter with the cover removed, Fig. 4 is a diagrammatic transverse view, partly in section and taken on line 4—4 of Fig. 1 and showing the manner of operating the printing mechanism, Fig. 5 is a partial transverse view, partly in section taken about on line 5—5 of Fig. 1 and showing the manner of locking the rotatable wheels.

Turning to the drawing and Fig. 1, a base 10 is provided with a pair of upright spaced-apart support arms 11 disposed upon base 10 to the extreme side edges thereof. The arms 11 are identical mirror images of one another and are secured to base 10 by conventional means, as for example, by fusion where the base 10 and the upright arms 11 are of thermoplastic material. Alternatively the base 10 and upright arms 11 may be made as an integral unit by a plastic molding procedure.

The bottom wall 12 of base 10 is recessed due to integral rim 13 of base 10. A pair of spaced-apart parallel ridges 14 are provided in said base 10 wall 12 and a screw threaded aperture is provided in wall 12 between ridges 14 to receive screw 15.

The left side of the base 10 is provided with a slot 16 to receive a conventional angular adjuster 17 having a slot 18 therein. As shown in Fig. 2 the screw 15 having a suitable large head to overlap the slot 18 of adjuster 17 is disposed through slot 18 and tightened into the base 10 thereby firmly securing adjuster 17 to base 10.

The rear wall of rim 13 is provided with a cavity 19, the side walls 20 of the cavity being apertured to receive a bolt 21 having a finger seizable head 22 and a partly threaded shank 23. As shown in Figs. 2 and 4, a travel bar 24 having a pair of spaced-apart upright stubs 25 is threaded in its center to receive threaded shank portion 23 of bolt 21. The stubs 25 pass through respective slots 26 in wall 12 and contact the longitudinal edge of a check 27 shown in outline in Fig. 1. The upright stubs 25 of adjuster 17 (Fig. 1) functions as an end stop for the check. Thus by adjusting adjuster 17 and traveler bar 24 checks of varying size may be placed under the printing numbers, to be described.

A collar 27 is placed in cavity 19 and the shank of bolt 21 is inserted through the respective walls of cavity 19 and collar 27 and then threadingly into travel bar 24. Collar 27 is locked to the shank of bolt 21 by set screw 28 so that turning of bolt head 22 causes the travel bar 24 to move to and fro depending upon the direction of turning of said bolt head 22.

Base 10 is provided with a top recessed table wall 29 extending from one side to the other side of the base for receiving a check to be printed. The front and rear edges of the table wall 29 are provided with set back walls 30, each having a horizontal ledge 31 upon which a centrally apertured guard plate 32 is disposed. The large longitudinal aperture 33 in plate 32 will accommodate all the printing numerals and indicia disposed in linear relationship thereover as will be described hereinafter.

The upright arms 11 are opposed and each provided with vertical slots 34. The slots 34 are in opposed relationship. A transverse guide rod 36 and a transverse guide block 37 are secured together by a plurality of lock blocks 38 through which rod 36 and block 37 pass. Slots 34 function to guide the check printing elements vertically downward upon the desired area of a suitably located check disposed thereunder.

As shown in Fig. 3 a spacer block 39 is rigidly fixed to or integral with each arm 11. A pivotable right angle lever 40 is provided with a long handle leg 41 integral with a depending short leg 42. The fulcrum of each lever 40 where leg 41 is integral with leg 42 is provided with an aperture and a pivot pin 43 is inserted therein and into the respective fixed block 39.

The lever handle legs 41 are secured together at their free end by means of a handle bar 44 permitting a person to grasp handle 44 and push the lever legs 41 downwardly.

As shown in Fig. 1, the entire printing mechanism is suspended on a pair of opposed suitable coil springs 45 each secured to a respective fixed prong 46 disposed in the apex of triangular arms 11. The bottom of each spring 45 is secured to an apertured spacer block 47 in whose aperture rod 36 passes. Spacer block 47 has integral upright prong 48 having a hole therein to receive the bottom end of spring 45.

The printing mechanism comprises the vertically moveable blocks 38 fixed to rod 36 and carrying standard indicia such as "The sum of," "dollars" and "cents" and a plurality of partly rotatable wheels 49 each having a fixed finger operable tab 50 in its top half portion. Wheels 49 are preferably made of molded plastic having an integral tab portion 50.

The wheel 49 (Fig. 5) consists of a solid top portion and a bottom portion having a semi-circular opening therein. A rubber printing strip 52 having the numerals 0 to 9 thereon is provided with enlarged ends 53. The wheel 49 is provided with diametrically opposed receiving slots 54 at the mid-points between the solid wheel portion and the apertured wheel portion.

The rubber strip 52 is disposed around the circumference of the apertured portion of the wheel 49 and the respective ends 53 thereof are locked in the respective slots 54 of the wheel 49.

In order to lock a selected number of a selected wheel 49 in place, block 37 which transverses through each block 38 and the apertures of all the wheels 49 is provided with borehole cavities over each wheel and a spring 55 is disposed in each borehole.

As shown in Fig. 5 each wheel 49 is provided with ball receiving slots 56 on the inner circumferential wall of the wheel aperture 57. A suitable ball 58 is disposed against spring 55 in the respective borehole over slots 56. Thus ball 58 is a detent locking device permitting wheel 49 to be rotated partly to right or left (Fig. 5) to selected numbers whereupon detent ball falls into a respective selected slot 56 thereby locking the selected number in place until the wheel 49 is again rotated by movement of tab 51. As shown inn Fig. 5, the respective wheels 49 rotate to right or left on rod 36 until wall 59 or 60 hits block 37. In short the partly rotatable wheels rotate at most about 180 degrees to the right or left. Indicia numbers 61 are diametrically disposed on the smooth top exterior wall surface corresponding to the number selected to be printed, so that the number selected to be printed appears at the very top of wheel 49 while its counterpart on rubber strip 52 is diametrically opposed at the very bottom of the wheel and ready to be printed on downward movement of all the wheels 49, blocks 38, rod 36 and guide block 37.

In order to print it is necessary to ink the selected numerals on the wheels 49 and the indicia on each block 38. To accomplish this end an ink pad 62 is disposed beneath the blocks 38 and the wheels 49. The pad 62 is rectangular and secured by conventional means to a rectangular pad holder 63 having hooks 64 on each of its four corners. Then each of the front hooks 64 firmly seizes a pin 65. A spring 66 is secured to each pin 65 and its other end is secured to a post 67 secured fixedly in a respective upright arm 11. Spring 66 is disposed horizontally and pulls pad 63 back to rest position beneath the printing wheels 49.

The rear hooks 64 of ink pad 63 receive a wire 68 (Fig. 3) having loops 69 on each of its ends which loops enter an aperture at the end of the short leg 42 of lever 40. Wire 68 functions as a swivel and lifts the pad 63 against the numerals and indicia to be printed and then slidingly pulls pad 63 from beneath the wheels 49 as short leg 42 moves outwardly.

In operating the device of this invention the numerals desired are selected by moving tabs 50 of the selected wheels 49. Next the handle 44 is pushed downwardly, this causes the ink pad 63 to rise and ink the selected numerals and the standard indicia on blocks 38. Continued downward movement of rod 44 causes the ink pad to be pulled to the rear of the check writer (Fig. 4). Further downward movement of levers 40 causes lever arms 41 to become horizontal so that they contact the extreme blocks 38 on the block top round surface. Lever long leg 41 may be provided with an anvil area 70 which area contacts the blocks 38.

Further movement of lever arm 41 below the horizontal plane causes the entire printing assembly to be pushed downward so as to cause the printing numbers to go through slot 33 of plate 32 and contact the check accurately positioned beneath slot 33 by adjuster 17 and travel bar 24.

The downward movement of rod 36 causes all elements secured thereto to move downwardly including block 37 which is fixed in suitable apertures in the blocks 38.

It is therefore evident that the downward movement of the levers 40 effects a continuous successive series of functions namely inking the numbers.

Release of hand pressure on rod 44 causes the spring 66 to pull the ink pad beneath wheels 49 with simultaneous action of spring 45 returning the printing assembly upward in slot 34 until rod 36 touches the top of slot 34.

In short the downward printing action is done against spring 45 whereas the inking action is done against spring 66.

This invention is provided with an ornamental cover plate shown in dotted outline by numeral 71 which is provided with suitable slots for passage of tabs 50 and levers 40. This cover plate is deemed to be of design merit and it is secured to base 10 by screws 72 (Fig. 2).

Having described the invention other obvious modifications will now become apparent to those skilled in the art but all these modifications are deemed to be within the scope of this invention and intended to be embraced within the claims herein.

We claim:

1. A checkwriter comprising a base; a pair of spaced-apart upright opposed arms secured rigidly to said base, each of said arms having a guide slot vertically disposed therein; downwardly moveable suspending printing means captively disposed in said slots of said opposed arms; a vertically disposed coil spring secured at its top to the inside wall of a respective arm and secured at its bottom to said printing means; a pair of substantially right angle levers each pivotally secured interiorly to a respective upright arm at the apex of the right angle, said levers each having a top horizontal leg and a depending vertical leg, said top legs being disposed above said printing means; handle means connecting the top legs of said lever arms; an ink pad normally disposed beneath said printing means; a pair of horizontal spring means secured at the front of the spring to a respective upright arm and secured at the rear of the spring to said ink pad; and a pair of swingable wires each having hooks on each end and pivotally secured at one end to the rear of said ink pad and pivotally secured at the other end to a respective depending leg of said respective levers, whereby downward movement of said handle causes the ink pad to ink said printing means followed by moving said printing means downward to engage a check disposed therebelow.

2. The checkwriter of claim 1 wherein said printing means comprise a transverse rod suspended from said vertical spring means, the ends of said rod being disposed in said respective vertical slot of said upright arms; a plurality of partly rotatable wheels disposed on said rod, said wheels having raised printing numerals at their bottom semi-circumferentially surface; a plurality of spaced-apart doubly apertured lock blocks disposed on the outside of said wheels and in between said wheels, each disposed through one of the apertures on said rod; a longitudinal guide block disposed beneath said rod with the block ends disposed in a respective slot of said upright arms, said guide block traversing the other aperture of each of said lock blocks; said rotatable wheels having semi-circular apertures in their bottom wheel half portion, said guide block passing through said wheel apertures.

3. The device of claim 2 wherein the inner surface of said semi-circular apertures of said wheel is provided with a lock slot behind each raised printing number; said guide block having a borehole therein adjacent each wheel aperture surface; a spring disposed in said borehole and a ball detent disposed against said borehole spring and urgingly against the inner surface of said wheel aperture whereby location of said detent ball in a respective lock slot temporarily locks said wheel so that the numeral below said slot is in printing position.

4. The device of claim 3 comprising adjustable means for suitably positioning a check, to be printed with the amount of the check, directly beneath said printing wheels.

5. The device of claim 4 comprising wheels having diametrically opposed slots in the wheel circumference midway between the top solid wheel half and the bottom apertured wheel half; a rubber strip having enlarged ends and raised numerals therein, said ends of said strip being disposed in a respective slot in said wheel circumference, said raised numerals of said rubber strip being stretched over the bottom circumference half of each of said wheels.

References Cited in the file of this patent

UNITED STATES PATENTS

| | | |
|---|---|---|
| 1,032,769 | Post | July 16, 1912 |
| 1,156,000 | Engstrom | Oct. 5, 1915 |
| 1,197,279 | Fesler | Sept. 5, 1916 |
| 1,235,565 | Hammer | Aug. 7, 1917 |